(12) United States Patent
Harrington et al.

(10) Patent No.: US 6,329,477 B1
(45) Date of Patent: Dec. 11, 2001

(54) METHOD FOR INCREASING DIENE CONVERSION IN EPDM TYPE POLYMERIZATIONS

(75) Inventors: Bruce A. Harrington, Houston; Charles C. Cozewith, Bellaire; Sudhin Datta, Houston, all of TX (US); Bernard J. Folie, Brussels (BE); John F. Walzer, Jr., Seabrook; Donna J. Crowther, Baytown, both of TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/260,784

(22) Filed: Mar. 2, 1999

Related U.S. Application Data

(60) Provisional application No. 60/076,841, filed on Mar. 4, 1998.

(51) Int. Cl.$^7$ .......................................................... C08F 2/06
(52) U.S. Cl. .................. 526/65; 526/66; 526/67; 526/68; 526/158; 526/127; 526/130; 526/160; 526/170; 525/53; 525/240; 525/270; 525/323
(58) Field of Search .............................. 526/943, 65, 66, 526/67, 68, 160, 941, 158, 127, 130, 170, 904; 525/53, 240, 270, 323

(56) References Cited

U.S. PATENT DOCUMENTS

| | | |
|---|---|---|
| 3,378,606 | 4/1968 | Kontos . |
| 3,629,212 | 12/1971 | Benedikter et al. . |
| 3,853,969 | 12/1974 | Kontos . |
| 3,969,470 | 7/1976 | Spiegelman .................. 260/897 A |
| 4,016,342 | 4/1977 | Wagensommer . |
| 4,306,041 | 12/1981 | Cozewith et al. . |
| 4,433,121 | 2/1984 | Kabu et al. .......................... 526/68 |
| 4,742,106 | 5/1988 | Kamiya et al. . |
| 4,774,292 | 9/1988 | Thiersault et al. . |
| 4,966,944 | 10/1990 | Kiang . |
| 5,026,798 | 6/1991 | Canich ............................ 526/127 |
| 5,132,262 | 7/1992 | Rieger et al. .................... 502/117 |
| 5,239,022 | 8/1993 | Winter et al. . |
| 5,391,618 | 2/1995 | Yamamoto et al. . |
| 5,464,906 | 11/1995 | Patton et al. .................... 525/240 |
| 5,478,898 | 12/1995 | Standaert . |
| 5,504,172 | 4/1996 | Imuta et al. . |
| 5,599,885 | 2/1997 | Kawasaki et al. .................. 526/68 |
| 5,696,213 | 12/1997 | Schiffino et al. ................. 526/158 |
| 5,700,896 | 12/1997 | Dolle et al. . |
| 5,708,090 | 1/1998 | Schreck et al. . |
| 5,710,219 | 1/1998 | Bates et al. . |
| 5,753,733 | 5/1998 | Langhauser et al. . |
| 5,977,251 | * 11/1999 | Kao et al. .......................... 525/53 |
| 5,990,242 | 11/1999 | Naga et al. . |

FOREIGN PATENT DOCUMENTS

| | | |
|---|---|---|
| 2157399 | 10/1995 | (CA) . |
| 0 067 525 A | 12/1982 | (EP) . |
| 366411 | 5/1990 | (EP) . |
| 0 416 379 A | 3/1991 | (EP) . |
| 0 686 649 A | 12/1995 | (EP) . |
| 0 714 923 A | 6/1996 | (EP) . |
| 389611 B1 | 6/1997 | (EP) . |
| 1200 362 | 7/1970 | (GB) . |
| H4-337308 | 11/1992 | (JP) . |
| 92/15619 | 9/1992 | (WO) . |
| 93/13143 | 7/1993 | (WO) . |
| 94/17112 | 8/1994 | (WO) . |
| WO 94 21700 A | 9/1994 | (WO) . |
| 96/33227 | 10/1996 | (WO) . |
| 97/36942 | 10/1997 | (WO) . |
| WO 97/36942 | 10/1997 | (WO) . |
| 98/02471 | 1/1998 | (WO) . |

\* cited by examiner

*Primary Examiner*—David W. Wu
*Assistant Examiner*—William Cheung
(74) *Attorney, Agent, or Firm*—Anthony Chi; Stephen D. Prodnuk

(57) ABSTRACT

This invention relates to a method of making polymer compositions, e.g. EPDM compositions, in a multistage reactor with monomers chosen from ethylene, $C_3$–$C_8$ alpha olefins, and a non conjugated diene. In particular, the invention relates to a process for improving diene conversion during the manufacture of the aforementioned polymer compositions by use of a multistage reactor and a metallocene catalyst system.

57 Claims, No Drawings

METHOD FOR INCREASING DIENE CONVERSION IN EPDM TYPE POLYMERIZATIONS

This application claims benefit to Provisional Application No. 60/076,841 filed Mar. 4, 1998.

BACKGROUND OF THE INVENTION

This invention relates to a method of making polymer compositions, e.g. EPDM compositions, in a multistage reactor with monomers chosen from ethylene, $C_3$–$C_8$ alpha olefins, and a non-conjugated diene. In particular, the invention relates to a process for improving diene conversion during the manufacture of the aforementioned polymer compositions by use of a multistage reactor and a metallocene catalyst system.

EPDM is a terpolymer or a polymer composed of three different types of monomers. The monomers which make up EPDM are: 1) ethylene, 2) propylene or some other higher alpha-olefin, and 3) a non-conjugated diene. Ethylene and propylene monomers provide a saturated backbone interrupted by the incorporation of non-conjugated diene monomers which provide for unsaturated groups in the EPDM chain. The presence of unsaturated groups is essential for curing or crosslinking of EPDM to produce a final rubber product because unsaturated groups provide readily available crosslinking sites. Improving the conversion of diene monomer in the polymerization reactor more efficiently incorporates unsaturated groups into polymer chains to make an EPDM with desirable curing or crosslinking properties.

Improved diene conversion also represents cost saving in the production of EPDM. Ethylene and propylene monomers are relatively cheap raw materials for EPDM when compared to significantly more expensive diene monomers such as dicyclopentadiene (DCPD), ethylidene norbornene (ENB) or 1,4 hexadiene. Improved diene conversion reduces the amount of unreacted expensive diene and reduces the necessity of recovering unreacted diene from the polymerization mixture for recycle back to the polymerization reactor. Recovery procedures are necessary not only to conserve diene monomers but also to remove unreacted diene which, if left unremoved, would lead to EPDM with undesirable cure properties. However, recovery procedures are costly and often lead to diene losses. Thus, it is desirable to obtain a diene conversion high enough to reduce or eliminate the need for diene recycling thereby lowering manufacturing costs.

EPDM has been produced in multistage reactors with Ziegler catalysts. An example is U.S. Pat. No. 3,629,212 which discloses that certain Ziegler catalysts can be reactivated by using a series of at least three reactors where ethylene, propylene and non-conjugated diene are added to each reactor. Catalyst is added to the first reactor with addition of reactivator to subsequent stages. This method has various disadvantages such as contamination of the polymer with reactivator residues and equipment corrosion due to the nature of these residues.

U.S. Pat. No. 4,016,342 discloses another method using multi-staged reaction operations to make EPDM. The method comprises adding ethylene, higher alpha-olefin, diene, Ziegler catalyst, co-catalyst and solvent in the first stage of the reaction. The same components are also added to the second stage reactor with the exception of catalyst. The method produces EPDM elastomers with relatively broad molecular weight distributions and very narrow compositional distributions. A disadvantage of this method is a relatively high amount of unreacted diene resulting from the addition of diene in the second reaction stage where catalyst concentration is low. The relatively high amount of diene leads to increased manufacturing costs and problems in curing the polymer.

U.S. Pat. No. 4,306,041 discloses a method for obtaining improved diene conversion in the manufacture of EPDM type terpolymers. Ethylene, higher alpha olefin, and diene and a Ziegler vanadium catalyst, co-catalyst and solvent are added to a reactor where polymerization occurs to make a polymer cement (polymer dissolved in solvent). The reactor contents including the polymer cement are passed to a second reactor where additional monomers are added and further polymerization occurs.

International Application WO 97/36942 discloses a non-adiabatic solution polymerization process using a metallocene catalyst for making ethylene, propylene, and styrene polymers such as polypropylene, styrene block copolymers, ethylene-propylene-diene (EPDM) elastomers, ethylene-propylene (EP) elastomers, ethylene-styrene copolymers, ethylene/alpha-olefin interpolymers, and polyethylene. This polymerization system and process includes the use of two flow loop reactors in series wherein catalyst is added to both reactors.

SUMMARY OF THE INVENTION

The present invention departs from the prior art by the use of a metallocene catalyst rather than prior art Zeigler vanadium catalysts (e.g. vanadium alkyl halide) in a multi-stage system to increase diene conversion. In general, during single reactor operation, metallocene catalysts of this invention have diene conversion of typically 15–40% as compared to the conversions of 60–85% with the vanadium catalysts of the prior art. Consequently, it is important to find economical methods to increase diene conversion with metallocenes. As a result of the high conversion obtained in a single reactor with vanadium catalysts, use of series reactors gives only a small additional conversion benefit. However, we have surprisingly found that moving from single to multiple reactors with metallocene catalysts causes a very significant improvement in diene conversion, much greater than one would anticipate in comparison to moving from single to multiple reactors with vanadium catalysts. In addition, by use of series reactors with metallocenes it is possible to obtain EPDM compositions that are not economical to produce with the prior vanadium systems. Note that the terms "multi-stage reactor" and "series reactor" are used interchangeably herein.

The use of a metallocene catalyst in this invention leads to the following advantages over prior art vanadium catalysts: 1) capability of producing a wider range of EPDM compositions, 2) capability of producing high propylene content EPDM compositions while maintaining good diene conversion, 3) capability of producing EPDM with propylene crystallinity, 4) capability of reactor operation at higher temperatures.

In contrast to multi-stage processes using vanadium catalysts, the process of this invention using metallocenes catalysts is capable of making more than 35 wt % of total polymer in a second reactor without any added amount of catalyst to the second reactor. Ziegler catalysts generally do not have such capability because their catalyst lifetimes are relatively short and leave low levels of active catalyst in a second or successive reactor. Because more of the total polymer product may be made in a second or successive reactor, a wider range of EPDM compositions is possible by varying the monomer makeup in each reactor while only adding catalyst to a first reactor. Thus the method of this invention conserves catalyst and reduces manufacturing costs.

While traditional Zeigler catalysts for EPDM such as vanadium alkyl halide catalysts show good diene conversion in general and particularly at high ethylene compositions, these catalysts are unsuitable for making EPDM polymers at low ethylene content because of an inability to efficiently polymerize propylene and other higher alpha olefins. Catalyst activity and polymer molecular weight decrease rapidly at ethylene contents less than about 40 wt %. Even when these catalysts are used in multi-staged reactor operation, propylene and diene conversion are uneconomically low for compositions with less than about 40 wt % ethylene. Metallocene catalysts maintain reasonable propylene and higher alpha olefin conversion at lower ethylene compositions (less than about 40 wt %). However, diene conversion in a single reactor is lower than desired. When these catalysts are used in multi-stage reactor operation, dramatic improvements in diene conversion result for low ethylene compositions as well as higher ethylene compositions. Therefore in addition to providing for high diene conversion, the process of this invention is capable of producing EPDM in the composition ranges of 5–20 40 wt % ethylene. This allows for greater freedom in tailoring various EPDM compositions by adjusting the ethylene and propylene (or higher alpha olefin) content in each reactor to achieve desired results. Terpolymers with between 5–20 wt % ethylene are expected to melt between about 140° C. and 40° C. when an isospecific metallocene catalysts is used.

Thus, by use of metallocene catalysts in series reactors, this invention is able to produce EPDM compositions with high stereoregular propylene content, sufficient diene content for good cure, and improved monomer and diene conversion relative to a single reactor.

Another advantage of metallocene catalysts is their ability to give good catalytic activity at temperatures above 100° C. In comparison, commercial use of vanadium catalysts is limited to reaction temperatures of less than 60° C. because they become thermally unstable at higher temperature.

The present invention can be summarized as a method of making a terpolymer of ethylene, higher alpha-olefin (e.g. propylene, butylene, hexene, and octene) and non-conjugated diene which comprises: a) feeding a first set of monomers containing a diene to a first reactor, b) adding a metallocene catalyst to the first reactor, c) operating the first reactor to polymerize the first set of monomers to produce an effluent containing a first polymer and optionally unreacted monomers, d) feeding the effluent of c) to a second reactor, e) feeding a second set of monomers to the second reactor, f) operating the second reactor to polymerize the second set of monomers and any unreacted monomers to produce a second polymer without introducing any substantial amount of catalyst to the second reactor. Thus, preferably greater than 50 wt % of the total amount of catalyst added to all reactors is added to the first reactor, more preferably greater than 75 wt %, and most preferably 100 wt % of the total amount of catalyst added to all reactors is added to the first reactor. The final polymer product comprises a mixture of said first and second polymers.

Preferably, the non-conjugated diene is added as a monomer to all the reactors provided that greater than 50% wt of the diene added to all the reactors is added to the first reactor. Most preferably, no diene is added after the first reactor. The non-conjugated diene may be chosen from the group consisting of 5-ethylidene-2-norbornene (ENB), 1,4-hexadiene, dicyclopentadiene (DCPD), norbornadiene, and 5-vinyl-2-norbornene (VNB).

Where molecular weight distribution is concerned, it is preferable that the above method makes a terpolymer composition with a $M_w/M_n$ of 2.0–12.0 and more preferably 2.0–5.0. Molecular weight may be controlled by adding a chain transfer agent to the first or second reactor or both reactors. Additionally, molecular weight may be controlled by operating the first and second reactors with a temperature difference between the reactors. In metallocene polymerizations low $M_w$ terpolymers can be made at higher temperatures in a second series reactor without the use of hydrogen as required by vanadium catalysts.

Where the catalyst is concerned, the catalyst components can be fed to the reactor either separately or premixed. It is preferable that substantially no additional catalyst is added after polymerization in the first reactor. The catalyst is a group 4, 5, or 6 metallocene catalyst activated by an alumoxane, e.g. methylalumoxane (MAO), or a non-coordinating anion (NCA) both described below. Preferably the catalyst is chiral and stereorigid. Preferably the catalyst is capable of producing stereo regular polypropylene so that isotactic stereoregularity is obtained in the terpolymer. Preferably the metallocene catalyst is $\mu$-$(CH_3)_2$Si(Indenyl)$_2$Hf $(CH_3)_2$, $\mu$-$(CH_3)_2$Si[tetramethylcyclopentadienyl] [adamantylamido] Ti$(CH_3)_2$, or $\mu$-$(C_6H_5)_2$Si [cyclopentadienyl][flourenyl]Hf$(CH_3)_2$.

Where reactor temperatures are concerned, it is preferably that the first reactor operates at temperatures between about 0 to 110° C. and the second reactor operates between about 40 to 140° C. Preferably the first reactor operates at temperatures between about 10 to 90° C. and the second reactor operates between about 50 to 120° C. Most preferably, the first reactor operates at temperatures between about 20 to 70° C. and the second reactor operates between about 60 to 110° C. Reactor temperature may be controlled by any technique known to those skilled in the art. In a preferred embodiment, temperature is controlled by prechilling the feeds and operating the reactor adiabatically.

To protect against catalyst deactivation, a scavenger can optionally be added to at least one of the sets of reactor feeds before their respective polymerizations. Preferably the scavenger is a trialkyl aluminum compound. More preferably the alkyl groups have greater than two carbon atoms.

Where the reactors are concerned, it is preferable that the first and second reactors are stirred tank reactors in series. Additionally, it is preferable that the polymerization in the first and second reactors is homogeneous solution polymerization.

DETAILED DESCRIPTION OF THE INVENTION

The process of the present invention may be performed by any of the well known multi-stage reactor systems. Two suitable systems are disclosed in U.S. Pat. No. 4,016,342 and U.S. Pat. No. 4,306,041 which are incorporated by reference for U.S. patent practice. Additionally, copending applications 60/076,713 filed on Mar. 4, 1998 and 60/076, 712 filed on Mar. 4, 1998, disclose suitable multistage reactor systems and are incorporated by reference for U.S. patent practice. If desired, more than two reactors can be used in the process of this invention. The process of the present invention is applicable to slurry or solution polymerization but solution polymerization is preferred and is exemplified herein.

Preferably the first polymer has an ethylene content of 0–85 wt % the second polymer has an ethylene content of 0–85 wt % and the final product polymer has an ethylene content of 6–85 wt %. Preferably the first polymer has a non-conjugated diene content of less than 20 wt %, the second polymer has a non-conjugated diene content of less than 20 wt %, and the final product polymer has a non-conjugated diene content of less than 20 wt %. The non-conjugated diene content of the first and second polymer may be the same or different, and the ethylene content of the first and second polymer may be the same or different. In a preferred mode of operation the difference in ethylene content is such that one polymer is semi crystalline and the other polymer is amorphous. It is particularly preferred that the semi-crystalline polymer contain isotatic polypropylene crystallinity. In another preferred mode of operation, the difference in ethylene content is such that the first and second polymers form a two phase polymer mixture. In another preferred mode of operation, the difference in diene content between the product of the first reactor and the product of the second reactor is at least 5% (relative) wt % and more preferably at least 10% (relative) wt %.

The ratio of the amounts of first and second polymer produced is controlled by adjusting the monomer feed rates to the reactors appropriately. The second polymer may be in the range of 10 to 90 wt % of the total product. It is most preferred that the second polymer comprise at least 35 wt % of the total product.

Choice of reactor temperature is dependent upon the effect of temperature on catalyst deactivation rate. Temperatures should not exceed the point at which the concentration of catalyst in the second reactor is insufficient to make the desired polymer component in the desired amount. This temperature will be a function of the details of the catalyst system. In general, the first reactor temperature can vary between 0–110° C. with 10–90° preferred and 20–70° most preferred. Second reactor temperatures will vary from 40–140°, with 50–120° preferred and 60–110° most preferred. The reactors may be cooled by reactor jackets, cooling coils, auto refrigeration, pre-chilled feeds or combinations of these. Adiabatic reactors with pre-chilled feeds are preferred. This gives rise to a temperature difference between reactors which is helpful for controlling polymer molecular weight.

Residence time is the same or different in each reactor stage as set by reactor volumes and flow rates. Residence time is defined as the average length of time reactants spend within a process vessel. The total residence time, i.e. the total time spent in all reactors is preferably 2–90 minutes and more preferably 540 minutes.

Polymer composition is controlled by the amount of monomers fed to each reactor of the train. In a two reactor series unreacted monomers from the first reactor flow into the second reactor and so the monomers added to the second reactor are just enough to adjust the composition of the feed to the desired level, taking into account the monomer carry over. Depending on reaction conditions in the first reactor (catalyst concentration, temperature, monomer feed rates, etc.) a monomer may be in excess in the reactor outlet relative to the amount required to make a certain composition in the second reactor. Since it is not economically feasible to remove a monomer from the reaction mixture, situations like this should be avoided by adjusting reaction conditions.

The polymer product can be recovered from solution at the completion of the polymerization by any of the techniques well known in the art such as steam stripping followed by extrusion drying or by devolatilizing extrusion.

Polymer molecular weight is controlled by reactor temperature, monomer concentration, and by the addition of chain transfer agents such as hydrogen. With metallocene catalysts, polymer molecular weight usually declines as reaction temperature increases and as the ethylene content of the polymer decreases. Adiabatic reactor operation in a two reactor series produces a higher temperature in the second reactor than the first making it easier to make the low molecular weight component in the second reactor. Molecular weight in the second reactor can be further reduced and MWD broadened by adding hydrogen to the second reactor. Hydrogen can also be added to the first reactor but because unreacted hydrogen will carry over to the second reactor the molecular weight of both polymer components will be decreased in this situation and the effect of hydrogen on MWD will be much less.

Weight average molecular weight of the product can range from 10,000 to 3,000,000, but is preferably from 20,000 to 700,000, and most preferably from 40,000 to 600,000.

In a two reactor series, diene can be added to either and must be added to the first reactor for improved diene conversion to occur. Preferably, 50–100 wt % of the total diene feed is added to the first reactor. When operating more than two reactors, the diene must be added to any reactor before the last, and would benefit the most (give the greatest diene conversion) if the diene is added to a reactor early in the sequence.

Higher Alpha Olefins

Although the most preferred higher alpha olefin is propylene for use with this invention, other higher alpha olefins may be used as set forth below. Higher alpha-olefins suitable for use may be branched or straight chained, cyclic, and aromatic substituted or unsubstituted, and are preferably $C_3$–$C_{18}$ alpha-olefins. Illustrative non-limiting examples of preferred higher alpha-olefins are propylene, 1-butene, 1-pentene, 1-hexene, 1-octene, and 1-dodecene. Mixed alpha-olefins can be used as well as mixed alpha and non-alpha olefins (e.g., mixed butenes) as long as any non-polymerizable olefins in the mixture act as inerts towards the catalyst. Illustrative of such substituted higher alpha-olefins are compounds of the formula $H_2C=CH-C_nH_{2n}-X$ wherein n is an integer from 1 to 30 carbon atoms (preferably to 10 carbon atoms), and X preferably comprises $CH_3$ but can comprise aryl, alkaryl, or cycloalkyl substitutents. Also useful are higher alpha-olefins substituted by one or more such X substituents wherein the substituent(s) are attached to a non-terminal carbon atom, more preferably being attached to a non-terminal carbon atom which is preferably 2 to 30 carbons removed from the terminal carbon atom, with the proviso that the carbon atom so substituted is preferably not in the 1- or 2-carbon position in the olefin. The higher alpha-olefins, when substituted, are preferably not substituted with aromatics or other bulky groups on the 2-carbon position since aromatic and bulky groups interfere with the subsequent desired polymerization.

Diene

Although ENB is the most preferred non-conjugated diene to be used in the invention, other non-conjugated dienes are usefuil as set forth below. Non-conjugated dienes useful as co-monomers preferably are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbomadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (NB), 5-propenyl-2-norbornene, 5-isopropylidene-2-norbornene, 5-(4-cyclopentenyl)-2-norbornene, norbomodiene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo (A-11,12) 5,8 dodecene. Particularly preferred diolefins are 5-ethylidene-2-norbornene (ENB), 1,4-hexadiene, norbomodiene, dicyclopentadiene (DCPD), and 5-vinyl-2-norbornene (VNB). Note that throughout this application the terms "non-conjugated diene" and "diene" are used interchangeably.

Solvent

Although hexane is the most preferred solvent to be used in the invention, other solvents which may be used are hydrocarbons such as aliphatics, cycloalphatics, and aromatic hydrocarbons. Preferred solvents are $C_{12}$ or lower straight-chain or branched-chain, saturated hydrocarbons, and $C_5$ to $C_9$ saturated alicyclic or aromatic hydrocarbons. Examples of such solvents or reaction media are hexane, butane, pentane, heptane, cyclopentane, cyclohexane, cycloheptane, methyl cyclopentane, methyl cyclohexane, isooctane, benzene, toluene, xylene and mixtures thereof. In addition, one or more—olefins, either alone or admixed with other media, may serve as the reaction media, at selected concentrations of such olefins.

Metallocene Catalyst Precursors

The term "metallocene" and "metallocene catalyst precursor" as used herein shall be understood to refer to compounds possessing a transition metal M, with cyclopentadienyl (Cp) ligands, at least one non-cyclopentadienyl-derived ligand X, and zero or one heteroatom-containing ligand Y, the ligands being coordinated to M and corresponding in number to the valence thereof. The metallocene catalyst precursors are generally neutral complexes but when activated with a suitable co-catalyst yield an active metallocene catalyst which refers generally to an organometallic complex with a vacant coordination site that can coordinate, insert, and polymerize olefins. The metallocene catalyst precursors is preferably one of, or a mixture of metallocene compounds of either or both of the following types:

1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

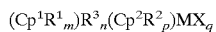

wherein $Cp^1$ of ligand $(Cp^1R^1_m)$ and $Cp^2$ of ligand $(Cp^2R^2_p)$ are the same or different cyclopentadienyl rings $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 0 to 5, p is 0 to 5, and two $R^1$ and/or $R^2$ substituents on adjacent carbon atoms of the cyclopentadienyl ring associated there with can be joined together to form a ring containing from 4 to about 20 carbon atoms, $R^3$ is a bridging group, n is the number of atoms in the direct chain between the two ligands and is 0 to 8, preferably 0 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or VIA of the periodic table of the elements. These mono-cyclopentadienyl complexes have the general formula

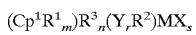

wherein $R^1$ is, each independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms, $R^3$ is a bridging group, "n" is 0 to 3, M is a transition metal having a valence of from 3 to 6, preferably from group 4, 5, or 6 of the periodic table of the elements and is preferably in its highest oxidation state, Y is a heteroatom containing group in which the heteroatom is an element with a coordination number of three from Group VA or a coordination number of two from group VIA preferably nitrogen, phosphorous, oxygen, or sulfur, $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of suitable biscyclopentadienyl metallocenes of the type described in group 1 above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference herein.

Illustrative, but not limiting examples of preferred biscyclopentadienyl metallocenes of the type described in group 1 above for the invention are the racemic isomers of:

$\mu$-$(CH_3)_2Si(indenyl)_2M(Cl)_2$
$\mu$-$(CH_3)_2Si(indenyl)_2M(CH_3)_2$
$\mu$-$(CH_3)_2Si(tetrahydroindenyl)_2M(Cl)_2$
$\mu$-$(CH_3)_2Si(tetrahydroindenyl)_2M(CH_3)_2$
$\mu$-$(CH_3)_2Si(indenyl)_2M(CH_2CH_3)_2$
$\mu$-$(C_6H_5)_2C(indenyl)_2M(CH_3)_2$;

wherein M is chosen from a group consisting of Zr and Hf.

Examples of suitable unsymmetrical cyclopentadienyl metallocenes of the type described in group 1 above for the invention are disclosed in U.S. Pat. Nos. 4,892,85 1; 5,334, 677; 5,416,228; and 5,449,651; and are described in publication *J Am. Chem.* Soc. 1988, 110, 6255, all of which are incorporated by reference herein.

Illustrative, but not limiting examples of preferred unsymmetrical cyclopentadienyl metallocenes of the type described in group 1 above for the invention are:

$\mu$-$(C_6H_5)_2C(cyclopentadienyl)(fluorenyl)M(R)_2$
$\mu$-$(C_6H_5)_2C(3\text{-methylcyclopentadienyl})(fluorenyl)M(R)_2$
$\mu$-$(CH_3)_2C(cyclopentadienyl)(fluorenyl)M(R)_2$
$\mu$-$(C_6H_5)_2C(cyclopentadienyl)(2\text{-methylindenyl})M(CH_3)_2$
$\mu$-$(C_6H_5)_2C(3\text{-methylcyclopentadienyl})(2\text{-methylindenyl})M(Cl)_2$
$\mu$-$(C_6H_5)_2C(cyclopentadienyl)(2,7\text{-dimethylfluorenyl})M(R)_2$
$\mu$-$(CH_3)_2C(cyclopentadienyl)(2,7\text{-dimethylfluorenyl})M(R)_2$;

wherein M is chosen form a group consisting of Zr and Hf and R is chosen from a group consisting of Cl and $CH_3$.

Examples of suitable monocyclopentadienyl metallocenes of the type described in group 2 above for the invention are disclosed in U.S. Pat. Nos. 5,026,798; 5,057, 475; 5,350,723; 5,264,405; 5,055,438 and are described in publication WO 96/002244, all of which are incorporated by reference herein.

Illustrative, but not limiting examples of preferred monocyclopentadienyl metallocenes of the type described in group 2 above for the invention are:

$\mu$-$(CH_3)_2Si(cyclopentadienyl)(1\text{-adamantylamido})M(R)_2$
$\mu$-$(CH_3)_2Si(3\text{-tertbutylcyclopentadienyl})(1\text{-adamantylamido})M(R)_2$
$\mu$-$(CH_2)(tetramethylcyclopentadienyl)(1\text{-adamantylamido})M(R)_2$
$\mu$-$(CH_3)_2Si(tetramethylcyclopentadienyl)(1\text{-adamantylamido})M(R)_2$
$\mu$-$(CH_3)_2C(tetramethylcyclopentadienyl)(1\text{-adamantylamido})M(R)_2$
$\mu$-$(CH_3)_2Si(tetramethylcyclopentadienyl)(1\text{-tertbutylamido})M(R)_2$
$\mu$-$(CH_3)_2Si(fluorenyl)(1\text{-tertbutylamido})M(R)_2$
$\mu$-$(CH_3)_2Si(tetramethylcyclopentadienyl)(1\text{-cyclododecylamido})M(R)_2$
$\mu$-$(C_6H_5)_2C(tetramethylcyclopentadienyl)(1\text{-cyclododecylamido})M(R)_2$;

wherein M is selected from a group consisting of Ti, Zr, and Hf and wherein R is selected from Cl and $CH_3$.

Another class of organometallic complexes that are useful catalysts for the process describe herein are those with diimido ligand systems such as those described in WO 96/23010 assigned to Du Pont. These catalytic polymerization compounds are incorporated here by reference.

Noncoordinating Anions

The term "noncoordinating anion" (NCA) means an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metailocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

Descriptions of ionic catalysts for coordination polymerization comprised of metallocene cations activated by non-coordinating anions appear in the early work in EP-A-0 277 003, EP-A-0 277 004, U.S. Pat. Nos. 5,198,401 and 5,278, 119, and WO92/00333. These teach a preferred method of preparation wherein metallocenes (bisCp and monoCp) are protonated by an anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion is also known. See, EP-A-0 426 637, EP-A- 0 573 403 and U.S. Pat. No. 5,387,568. Reactive cations other than Bronsted acids capable of ionizing the metallocene compounds include ferrocenium triphenylcarbonium and triethylsilylinium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like. The description of non-coordinating anions and precursors thereto of these documents are incorporated by reference for purposes of U.S. patent practice.

An additional method of making the ionic catalysts uses ionizing anionic pre-cursors which are initially neutral Lewis acids but form the cation and anion upon ionizing reaction with the metallocene compounds, for example tris(pentafluorophenyl) boron acts to abstract an alkyl, hydride or silyl ligand to yield a metallocene cation and stabilizing non-coordinating anion, see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

Examples of suitable activators capable of ionic cationization of the metallocene compounds of the invention, and consequent stabilization with a resulting noncoordinating anion include:

trialkyl-substituted ammonium salts such as;
  triethylammonium tetraphenylborate,
  tripropylammonium tetraphenylborate,
  tri(n-butyl)ammonium tetraphenylborate,
  trimethylammonium tetrakis(p-tolyl)borate,
  trimethylammonium tetrakis(o-tolyl)borate,
  tributylammonium tetrakis(pentafluorophenyl)borate,
  tripropylammonium tetrakis(o,p-dimethylphenyl)borate,
  tributylammonium tetrakis(m,m-dimethylphenyl)borate,
  tributylammonium tetrakis(p-trifluoromethylphenyl) borate,
  tributylammonium tetrakis(pentafluorophenyl)borate,
  tri(n-butyl)ammonium tetrakis(o-tolyl)borate and the like;
N,N-dialkyl anilinium salts such as:
  N,N-dimethylanilinium tetrakis(pentafluorophenyl) borate,
  N,N-dimethylaniliniumtetrakis(heptafluoronaphthyl) borate,
  N,N-dimethylanilinium tetrakis(perfluoro4-biphenyl) borate,
  N,N-dimethylanilinium tetraphenylborate,
  N,N-diethylanilinium tetraphenylborate,
  N,N-2,4,6-pentamethylanilinium tetraphenylborate and the like;
dialkyl ammonium salts such as:
  di-(isopropyl)ammonium tetrakis(pentafluorophenyl) borate,
  dicyclohexylammonium tetraphenylborate and the like;
and triaryl phosphonium salts such as:
  triphenylphosphonium tetraphenylborate,
  tri(methylphenyl)phosphonium tetraphenylborate,
  tri(dimethylphenyl)phosphonium tetraphenylborate and the like.

Further examples of suitable anionic precursors include those comprising a stable carbonium ion, and a compatible non-coordinating anion. These include:
  tropillium tetrakis(pentafluorophenyl)borate,
  triphenylmethylium tetrakis(pentafluorophenyl)borate,
  benzene (diazonium) tetrakis(pentafluorophenyl)borate,
  tropillium phenyltris(pentafluorophenyl)borate,
  triphenylmethylium phenyl-(trispentafluorophenyl) borate,
  benzene (diazonium) phenyl-tris(pentafluorophenyl) borate,
  tropillium tetrakis(2,3,5,6-tetrafluorophenyl)borate,
  triphenylmethylium tetrakis(2,3,5,6-tetrafluorophenyl) borate,
  benzene(diazonium) tetrakis(3,4,5-trifluorophenyl) borate,
  tropillium tetrakis(3,4,5-trifluorophenyl)borate,
  benzene(diazonium) tetrakis(3,4,5-trifluorophenyl) borate,
  tropillium tetrakis(3,4,5-trifluorophenyl)aluminate,
  triphenylmethylium tetrakis(3,4,5-trifluorophenyl) aluminate,
  benzene(diazonium) tetrakis(3,4,5-trifluorophenyl) aluminate,
  tropillinum tetrakis(1,2,2-trifluoroethenyl)borate,
  triphenylmethylium tetrakis(1,2,2-trifluoroethenyl) borate,
  benzene(diazonium) tetrakis(1,2,2-trifluoroethenyl) borate,
  tropillium tetrakis(2,3,4,5-tetrafluorophenyl)borate,
  triphenylmethylium tetrakis(2,3,4,5-tetrafluorophenyl) borate,
  benzene (diazonium) tetrakis(2,3,4,5-tetrafluorophenyl) borate, and the like.

Where the metal ligands include halide moieties for example, (methyl-phenyl) silylene(tetra-methyl-cyclopentadienyl)(tert-butyl-amido) zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-Al-0 570 982 and EP-Al-0 612 768 for processes describing the reaction of alkyl aluminum compounds with dihalide substituted metallocene compounds prior to or with the addition of activating anionic compounds. For example an aluminum alkyl compound may be mixed with the metallocene prior to its introduction into the reaction vessel. Since the alkyl aluminum is also suitable as a scavenger its use in excess of that normally stoichiometrically required for akylation of the metallocene will permit its addition to the reaction solvent with the metallocene compound. Normally alumoxane would not be added with the metallocene so as to avoid premature activation, but can be added directly to the reaction vessel in the presence of the polymerizable monomers when serving as both scavenger and alkylating activator.

Known alkylalumoxanes are additionally suitable as catalyst activators, particularly for those metallocenes comprising halide ligands. The alumoxane component useful as catalyst activator typically is an oligomeric aluminum compound represented by the general formula $(R—Al—O)_n$, which is a cyclic compound, or $R(R—Al—O)_nAl R_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4, i.e. methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Although trialkyl aluminum is the most preferred scavenger to be used in the invention, other scavengers may be used as set forth below. The term "scavenging compounds" as used in this application and in the claims is meant to include those compounds effective for removing polar impurities from the reaction solvent. Such impurities can be inadvertently introduced with any of the polymerization reaction components, particularly with solvent, monomer and comonomer feed, and adversely affect catalyst activity and stability. It can result in decreasing or even elimination of catalytic activity, particularly when a metallocene cation-noncoordinating anion pair is the catalyst system. The pola impurities, or catalyst poisons include water, oxygen, oxygenated hydrocarbons, metal impurities, et c. Preferably steps are taken before provision of such into the reaction vessel, for example by chemical treatment or careful separation techniques after or during the synthesis or preparation of the various components, but some minor amounts of scavenging compound will still normally be required in the polymerization process itself. Typically the scavenging compound will be an organometallic compound such as the Group-13 organometallic compounds of 5,153,157, 5,241, 025, EP-A-0 426 638 and WO-A-91/09882 and WO-A-94103506, noted above, a nd th at of WO-A-93/14132. Exemplary compounds include triethyl aluminum, triethyl borane, tfi-isobutyl aluminum, isobutyl aluminumoxane, those having bulky substituents covalently bound to the metal or metalloid center being preferred to minimize adverse interaction with the active catalyst. When an alumoxane is used as activator, additional scavenging compounds are not necessary. The amount of scavenging agent to be used with metallocene cation-noncoordinating anion pairs is minimized during polymerization reactions to that amount effective to enhance activity.

EXAMPLES

Polymerizations were carried out in two, one liter stirred reactors in series with continuous flow of feeds to the system and continuous withdrawal of products. The first reactor could also be operated as a single reactor. Solvent, including but not limited to hexane, and monomers including but not limited to, ethylene, propylene, and ENB (5-ethylidene-2-norbornene) were purified over beds of alumina and mole sieves. Toluene for preparing catalyst solutions was also purified by the same technique. All feeds were pumped into the reactors by metering pumps except for the ethylene which flowed as a gas under its own pressure through a mass flow meter/controller. Reactor temperature was controlled by circulating water through a reactor cooling jacket. The reactors were maintained at a pressure in excess of the vapor pressure of the reactant mixture to keep the reactants in the liquid phase. The reactors were operated liquid full.

Ethylene and propylene feeds were combined into one stream and then mixed with a pre-chilled hexane stream that had been cooled to at least 0° C. If ENB was used, it was also fed into the hexane stream upstream of the other monomers. A hexane solution of triisobutyl aluminum scavenger was added to the combined solvent and monomer stream just before it entered the reactor to further reduce the concentration of any catalyst poisons. A mixture of the catalyst components in toluene was pumped separately to the reactor and entered through a separate port. The solution of polymer, solvent, unconverted monomers, and catalyst exiting the first reactor entered the second reactor. An additional hexane solution of the monomers was fed into the second reactor through a separate port.

The product from the second reactor exited through a pressure control valve that reduced the pressure to atmospheric. This caused the unconverted monomers in the solution to flash into a vapor phase which was vented from the top of a vapor liquid separator. The liquid phase, comprising mainly polymer and solvent, flowed out the bottom of the separator and was collected for polymer recovery. Polymer was recovered from solution by either steam stripping following by drying, or by solvent evaporation under heat and vacuum.

The polymer from the first and second reactors was characterized by Mooney viscosity (by Mooney Viscometer, ASTM D1648), ethylene content (by FTIR, ASTM D3900), ENB content (by FTIR, ASTM D6047), melt temperature and/or glass transition temperature (by DSC, described herein), and molecular weight (by GPC, described herein). Analysis of the second reactor polymer represents the properties of the overall polymer blend.

Gel Permeation Chromatography (GPC) techniques that were used to characterize the products of this invention have been described in several publications notably U.S. Pat. No. 4,989,436 which is incorporated for purposes of U.S. patent practice. Molecular weight and composition measurements are described in G. Ver Strate, C. Cozewith, S. Ju, *Macromolecules*, 21, 3360 (1988) which is incorporated by reference for purposes of U.S. patent practice. Differential scanning calorimetry (DSC) was used to characterize the products of this invention has a standard protocol of loading a calorimeter at 20° C. with a specimen free of molding strains, annealing at room temperature for 40 hours, cooling the sample to −75° C., scanning to 180° C. at 10° C./min., cooling to −75° C., and re-running the scan. The $T_g$, $T_m$, and heat of fusion are evaluated. In some cases, low melting crystallinity will not be seen on the second scan as it may take many hours to develop even at low temperatures.

Samples of the polymer solution from the first and second reactors were analyzed for polymer concentration. From this measurement and the reactor feed rates, the polymerization rates in both reactors could be determined by material balances. Monomer conversions were then calculated from the polymerization rate and polymer composition data for the first reactor alone and for the total of both reactors together. In order to calculate the polymerization rate and polymer composition in the second reactor alone, the following material balance equations were used:

$$PR_2 = PR_t - PR_1 \qquad \text{Eq. 1}$$

$$F_1 = PR_1 / PR_t \qquad \text{Eq. 2}$$

$$E_2 = \{E_t - (F_1 \times E_1)\}/(F_1 - 1) \qquad \text{Eq. 3}$$

$$D_2 = \{D_t - (F_1 \times D_1)\}/(F_1 - 1) \qquad \text{Eq. 4}$$

$$MN_2 = (1 - F_1)/(1/MN_t - F_1/MN_1) \qquad \text{Eq. 5}$$

$$MW_2 = (MW_t - F_1 * MW_1)/(1 - F_1) \qquad \text{Eq. 6}$$

where:
 $PR_1$=1st reactor polymerization rate
 $PR_2$=2nd reactor polymerization rate
 $PR_t$=Total polymerization rate
 $E_1$=Ethylene content of 1st reactor polymer
 $E_2$=Ethylene content of 2nd reactor polymer
 $E_t$=Ethylene content of total reactor polymer
 $D_1$=Diene content of 1st reactor polymer
 $D_2$=Diene content of 2nd reactor polymer
 $D_t$=Diene content of total reactor polymer
 $F_1$=Fraction of total polymer made in first reactor
 $MN_1$=Number average MW of 1st reactor polymer
 $MN_2$=Number average MW of 2nd reactor polymer
 $MN_t$=Number average MW of total reactor polymer
 $MW_1$=Weight average MW of 1st reactor polymer
 $MW_2$=Weight average MW of 2nd reactor polymer MW$_t$=Weight average MW of total reactor polymer A series of polymerizations was carried out to demonstrate the process and products of this invention. All of the reactor conditions, polymer analyses and polymerization results are given in Table 1. The table entries shown for reactor 1 (R-1) and the total product are based on actual measurements for the reactor 1 polymer and the polymer mixture exiting reactor 2. The results for reactor 2 (R-2) alone were calculated from these data by means of the formulas given above.

EXAMPLE 1 (Run 173A)

A series reactor polymerization was carried out to make a 51:49 blend of an EPDM terpolymer in R1 and an EP copolymer in R2 with dimethylsilyenebis(indenyl) dimethylhafnium [$\mu$-(CH$_3$)$_2$Si(Indenyl)$_2$Hf(CH$_3$)$_2$], Cat A, catalyst activated with N,N dimethylaniliniumtetrakis (pentafluorophenyl)borate [DMAH$^+$B$^-$(pfp)$_4$], Cocat 1. The catalyst components were dissolved in dry toluene in a 1/1 molar ratio to activate and then transferred to a vessel for metered delivery to the reactor. Reactor conditions and feed rates are shown in Table 1. The activated catalyst was fed to R$_1$ only and catalyst efficiency is calculated by dividing the overall polymerization rate by the Cat A feed rate. A monomer mixture of ethylene, propylene, and 5-ethylidene-2-norbornene (ENB) in hexane solvent (3L/h) was fed to the first reactor but only ethylene and propylene were fed to the second reactor. The polymer produced in the first and second reactors had similar ethylene composition (30% in the first reactor polymer and about 46% in the second reactor polymer). Diene conversion in the first reactor was 42.4% resulting in a polymer with 3.0% ENB content, however even without additional ENB in R2, 53.3% of the remaining ENB was converted in R2 resulting in an overall blend containing 2.65% ENB for a 73.1% overall ENB conversion. This represents a 72% increase in ENB conversion as a result of using series reactors.

EXAMPLE 2 (Run 185A)

A series reactor polymerization was carried out similar to example 1 to make a 25:75 EPDMIEP polymer blend with Cat A and Cocat 1. Again the polymers produced in the first and second reactors had similar ethylene composition, but at much lower ethylene content overall (15.6% in R1, 13.3% R2). Diene conversion in the first reactor was 10.7% resulting in a polymer with 5.2% ENB content, however even without additional ENB in R2, 20.2% of the remaining ENB was converted in R2 resulting in an overall blend containing 3.5% ENB for a 28.7% overall ENB conversion. This represents a 168% increase in ENB conversion as a result of using series reactors.

EXAMPLE 3 (Run 185B)

A series reactor polymerization was carried out similar to example 2 to make a 25:75 EPDM/EP polymer blend with Cat A and Cocat 1. Again the polymers produced in the first and second reactors had similar ethylene composition, and low ethylene content overall, (16.9% in R1, 15.7% R2). In this run overall diene incorporation is greater. Diene conversion in the first reactor was 10.9% resulting in a polymer with 6.7% ENB content, however even without additional ENB in R2, 21.7% of the remaining ENB was converted in R2 resulting in an overall blend containing 4.7% ENB for a 30.2% overall ENB conversion. This represents a 177% increase in ENB conversion as a result of using series reactors.

EXAMPLE 4 (Run 200A)

A series reactor polymerization was carried out similar to example 1 to make a 43:57 EPDM/EP polymer blend with Cat A and Cocat 1. The polymers produced in the first and second reactors had similar ethylene composition as example 1, i.e., moderate ethylene content overall, (30.5% in R1, 34.5% R2). ). In this run overall diene incorporation is greater than in example 1. Diene conversion in the first reactor was 31.7% resulting in a polymer with 4.5% ENB content, however even without additional ENB in R2, 44.2% of the remaining ENB was converted in R2 resulting in an overall blend containing 3.8% ENB for a 61.9% overall ENB conversion. This represents a 95% increase in ENB conversion as a result of using series reactors.

EXAMPLE 5 (Run 223B)

A series reactor polymerization was carried out similar to example 2 to make a 16:84 EPDM/EP polymer blend with Cat A and Cocat 1. Again the polymers produced in the first and second reactors had similar ethylene composition, and very low ethylene content overall, (12.5% in R1, 12.1% R2). Diene conversion in the first reactor was 7.0% resulting in a polymer with 6.1% ENB content, however even without additional ENB in R2, 23.7% of the remaining ENB was converted in R1resulting in an overall blend containing 4.1% ENB for a 29.0% overall ENB conversion. This represents a 314% increase in ENB conversion as a result of using series reactors.

EXAMPLE 6 (Run 225A)

A series reactor polymerization was carried out similar to example 5 to make a 17:83 EPDM/EP polymer blend with Cat A and Cocat 1. Again the polymer produced in the first and second reactors had similar ethylene composition, and low ethylene content overall, (15.9% in R1, 15.6% R2). ). In this run overall diene incorporation is greater. Diene conversion in the first reactor was 6.0% resulting in a polymer with 6.6% ENB content, however even without additional ENB in R2, 24.0% of the remaining ENB was converted in R2 resulting in an overall blend containing 5.3% ENB for a 28.5% overall ENB conversion. This represents a 375% increase in ENB conversion as a result of using series reactors.

EXAMPLE 7 (Run 270A)

A series reactor polymerization was carried out to make a 26:74 blend of an EPDM terpolymer in R$_1$ and additional EPDM terpolymer in R2 with m-dimethylsilyl (tetramethylcyclopentadienyl)(adanantylamido) dimethyltitanium [m-(CH$_3$)$_2$Si((CH$_3$)$_4$Cp)(N—C$_{10}$H$_{15}$)Ti(CH3)2], Cat B, catalyst activated with N,N-dimethylaniliniumtretakis(pentafluorophenyl)borate [DMAH$^+$B$^-$(pfp)$_4$], Cocat 1. The catalyst components were dissolved in dry toluene in a 1/1 molar ratio to activate and then transferred to a vessel for metered delivery to the reactor. Reactor conditions and feed rates are shown in Table 1. The activated catalyst was fed to R1only and catalyst efficiency is calculated by dividing the overall polymerization rate by the Cat B feed rate. A monomer mixture of ethylene, propylene, and 5-ethylidene-2-norbornene (ENB) in hexane solvent (5.4 L/h) was fed to the first reactor and an additional amount of ENB was fed to the second reactor to replace that which had been used in R1. Ethylene and propylene were also fed to the second reactor. The polymer produced in the first and second reactors had similar ethylene composition (70% in the first reactor polymer and about 66.5% in the second reactor polymer). Diene conversion in the first reactor was 14.7% resulting in a polymer with 6.3% ENB content. With additional ENB in R2, 21.4% of all the ENB was converted in R2 resulting in an overall blend containing 4.6% ENB for a 30.0% overall ENB conversion. This represents a 104% increase in ENB conversion as a result of using series reactors.

EXAMPLE 8 (Run 272A)

A series reactor polymerization was carried out similar to example 7 to make a 62:38 EPDM/EPDM terpolymer blend with Cat B and Cocat 1. In this run the polymers produced in the first and second reactors had very different ethylene compositions (32.5% in R1, 79.5% R2). Diene conversion in the first reactor was 27.2% resulting in a polymer with 4.1% ENB content. With additional ENB in R2, 17.1% of all the ENB was converted in R2 resulting in an overall blend containing 4.3% ENB for a 33.8% overall ENB conversion. This represents a 24% increase in ENB conversion as a result of using series reactors.

EXAMPLE 9 (Run 293B)

A series reactor polymerization was carried out similar to example 8 to make a 21:79 EPDM/EPDM terpolymer blend with Cat B and Cocat 1. In this run the polymers produced in the first and second reactors had very different ethylene compositions (36.8% in R1, 55.9% R2). In addition the amount of polymer made in R2 was much greater than that in example 8. Diene conversion in the first reactor was 6.5% resulting in a polymer with 1.1% ENB content. With additional ENB in R2, 6.0% of all the ENB was converted in R2 resulting in an overall blend containing 0.7% ENB for a 8.9% overall ENB conversion. This represents a 37% increase in ENB conversion as a result of using series reactors.

EXAMPLE 10 (Run 293D)

A series reactor polymerization was carried out similar to example 8 to make a 57:43 EPDM/EPDM terpolymer blend with Cat B and Cocat 1. Again the polymers produced in the first and second reactors had very different ethylene compositions (69.0% in R1, 30.7% R2), however in this example the high ethylene containing polymer was made in R1 rather than in R2 as was the case in examples 7–9. Diene conversion in the first reactor was 25.8% resulting in a polymer with 5.1% ENB content. With additional ENB in R2, 16.0% of all the ENB was converted in R2 resulting in an overall blend containing 5.1% ENB for a 30.3% overall ENB conversion. This represents a 17% increase in ENB conversion as a result of using series reactors.

EXAMPLE 11 (Run 319B)

A series reactor polymerization was carried out similar to example 8 to make a 77:23 EPDM terpolymer with Cat B and Cocat 1. In this example no additional monomers or diene were added to R2, however the R1 stream did run through R2 set at a higher temperature. The polymers produced in the first and second have, as expected, very similar ethylene compositions (75.3% in R1, 75.1% R2). Diene conversion in the first reactor was 22.4% resulting in a polymer with 4.3% ENB content. Without any additional monomers in R2, 11.2% of the remaining ENB was converted in R2 resulting in an overall blend containing 4.6% ENB for a 31.1% overall ENB conversion. This represents a 39% increase in ENB conversion as a result of using series reactors.

EXAMPLE 12 (Run 319C)

A series reactor polymerization was carried out to make a 51:49 blend of an EPDM terpolymer in R1 and an EP copolymer in R2 using m-dimethylsilyl (tetramethylcyclopentadienyl) (adamantylamidordimethyltitanium [m-$(CH_3)_2$Si(($CH_3)_4$Cp)(N—$C_{10}H_{15}$)Ti($CH_3)_2$], Cat B, catalyst activated with N,N-dimethylaniliniumtretakis(pentafluorophenyl)borate [$DMAH^+B^-(pfp)_4$], Cocat 1. The catalyst components were dissolved in dry toluene in a 1/1 molar ratio to activate and then transferred to a vessel for metered delivery to the reactor. Reactor conditions and feed rates are shown in Table 1. The activated catalyst was fed to R1 only and catalyst efficiency is calculated by dividing the overall polymerization rate by the Cat B feed rate. A monomer mixture of ethylene, propylene, and 5-ethylidene-2-norbornene (ENB) in hexane solvent (5.4 L/h) was fed to the first reactor but only ethylene and propylene were fed to the second reactor. The polymer produced in the first and second reactors had very different ethylene compositions (76.2% in the first reactor polymer and about 38.9% in the second reactor polymer). Diene conversion in the first reactor was 22.4% resulting in a polymer with 4.35% ENB content, and without additional ENB in R2, 17.1% of the remaining ENB was converted in R2 resulting in an overall blend containing 3.53% ENB for a 35.6% overall ENB conversion. This represents a 59% increase in ENB conversion as a result of using series reactors.

EXAMPLE 13 (Run 334B)

A series reactor polymerization was carried out similar to example 12 to make a 29:71 EPDM/EP polymer blend with Cat B and Cocat 1. The polymers produced in the first and second reactors had different ethylene compositions, (71.0% in R1, 43.8% R2), but resulting in a blend with 51% ethylene content. In this run the polymer compositions are similar to run 12, but the overall diene incorporation is greater, and the polysplit is such that a larger share of the blend is made in R2. Diene conversion in the first reactor was 26.5% resulting in a polymer with 6.7% ENB content, however even without additional ENB in R2, 33.9% of the remaining ENB was converted in R2 resulting in an overall blend containing 3.7% ENB for a 51.5% overall ENB conversion. This represents a 94% increase in ENB conversion as a result of using series reactors.

EXAMPLE 14 (Run 334B)

A series reactor polymerization was carried out similar to example 1, but at shorter overall residence time to make a 48:52 blend of an EPDM terpolymer in R1 and an EP copolymer in R2 with dimethylsilyenebis(indenyl) dimethylhafnium [m-$(CH_3)_2$Si(Indenyl)$_2$Hf($CH_3)_2$], Cat A, catalyst activated with N,N-dimethylaniliniumtretakis (pentafluorophenyl)borate [$DMAH^+B^-(pfp)_4$], Cocat 1. The catalyst components were dissolved in dry toluene in a 1/1 molar ratio to activate and then transferred to a vessel for metered delivery to the reactor. Reactor conditions and feed rates are shown in Table 1. The activated catalyst was fed to R1 only and catalyst efficiency is calculated by dividing the overall polymerization rate by the Cat A feed rate. A monomer mixture of ethylene, propylene, and 5-ethylidene-2-norbornene (ENB) in hexane solvent (5.4 L/h) was fed to the first reactor but only ethylene and propylene were fed to the second reactor. The polymer produced in the first and second reactors had different ethylene compositions (71.5% in the first reactor polymer and about 50.0% in the second reactor polymer). Diene conversion in the first reactor was 45.8% resulting in a polymer with 4.45% ENB content, however even without additional ENB in R2, 35.0% of the remaining ENB was converted in R2 resulting in an overall blend containing 3.0% ENB for a 64.7% overall ENB conversion. This represents a 41% increase in ENB conversion as a result of using series reactors.

EXAMPLE 15 (Run 340C)

A series reactor polymerization was carried out similar to example 14 to make a 40:60 EPDM/EP polymer blend with Cat A and Cocat 1. The polymers produced in the first and second reactors had ethylene compositions similar to example 14 (71.2% in R1, 41.4% R2), but the diene feed was greater in this example. Diene conversion in the first reactor was 36.2% resulting in a polymer with 5.9% ENB content, however even without additional ENB in R2, 35.1% of the remaining ENB was converted in R2 resulting in an overall blend containing 3.85% ENB for a 58.6% overall ENB conversion. This represents a 62% increase in ENB conversion as a result of using series reactors.

EXAMPLE 16 (Run 383A)

A single reactor polymerization was carried out to determine the monomer, comonomer, and diene conversion at a specific set of conditions for comparative purposes. In this single reactor run an EPDM terpolymer was made with dimethylsilyenebis(indenyl) dimethylhafnium [m-$(CH_3)_2$Si (Indenyl)$_2$Hf(CH))$_2$], Cat A, catalyst activated with N,N-dimethylaniliniumtretakis(pentafluorophenyl)borate [$DMAH^+B^-(pfp)_4$], Cocat 1. The catalyst components were dissolved in dry toluene in a 1/1 molar ratio to activate and then transferred to a vessel for metered delivery to the reactor. Reactor conditions and feed rates are shown in Table 1. The activated catalyst was fed to R1only and catalyst efficiency is calculated by dividing the overall polymerization rate by the Cat A feed rate. A monomer mixture of ethylene, propylene, and 5-ethylidene-2-norbornene (ENB) in hexane solvent (5.4L/h) was fed to the first reactor only. The polymer produced had a moderate ethylene compositions (45.7 wt %). Diene conversion was 44.0% resulting in a polymer with 3.38% ENB content.

EXAMPLE 17 (Run 383B)

A single reactor polymerization was carried out to determine the monomer, comonomer, and diene conversion under the same set of conditions established in example 16, but at twice the residence time. Residence time was doubled by cutting each feed rate in half. In this single reactor run an EPDM terpolymer was made with Cat A and Cocat 1. A monomer mixture of ethylene, propylene, and 5-ethylidene-2-norbornene (ENB) in hexane solvent (2.7 L/h) was fed to the first reactor only. The polymer produced had a moderate ethylene compositions (43.6 wt %). Diene conversion was 55.1% resulting in a polymer with 3.39% ENB content. Doubling the residence time improved the diene conversion 25.3% over example 16.

EXAMPLE 18 (Run 383C)

A series reactor polymerization was carried out to determine the monomer, comonomer, and diene conversion under similar conditions established in example 16 and at the same residence time established in example 17. This example compares the effect of series reactor operation to single reactor operation at similar residence time. This series reactor polymerization made a 65:35 EPDM/EP polymer blend with Cat A and Cocat 1. The polymers produced in the first and second reactors had similar ethylene compositions set to match that of examples 16 and 17 (45.1% in R1, 48.8% R2. Diene conversion in the first reactor was 61.9% resulting in a polymer with 3.99% ENB content, however even without additional ENB in R2, 45.2% of the remaining ENB was converted in R2 resulting in an overall blend containing 3.30% ENB for a 79.1% overall ENB conversion. This represents an 43.6% increase in ENB conversion as a result of using series reactors over single reactor operation at similar residence time.

It will be understood that the embodiments described above are merely exemplary and that persons skilled in the art may make many variations and modifications without departing from the spirit and scope of the invention. All such modifications and variations are intended to be included within the scope of the invention as defined by the appended claims.

TABLE 1

Series Reactor Run Conditions And Product Properties

| Experiment # Book # Catalyst | Reactor | Composition | Poly Split (%) | Run Temp (°C.) | EP C2= (Wt %) | Comp ENB (Wt %) | Residence Time (min) | ML (125° C.) (1 + 4) | Feed Rates | | | Catalyst (g/h) | Conversions | | | Catalyst Efficiency (g/g) |
|---|---|---|---|---|---|---|---|---|---|---|---|---|---|---|---|---|
| | | | | | | | | | C2= (g/h) | C3= (g/h) | ENB (g/h) | | C2= (%) | C3= (%) | ENB (%) | |
| 1 | R1 | EPDM | 51.3 | 31 | 30.3 | 3 | 16.3 | | 60 | 222 | 10.2 | 0.00880 | 70.9 | 44.1 | 42.4 | 16450 |
| 173A | R2 | EP | 48.7 | 65 | 46.1 | 2.28 | 11.8 | | 60 | 73.2 | 0 | | 80 | 31.4 | 53.3 | 15628 |
| M1 | Final | Blend | 100 | | 38 | 2.65 | 28.1 | 18.5 | 120 | 295.2 | 10.2 | | 87.00 | 57.7 | 73.1 | 32078 |
| 2 | R1 | EPDM | 25 | 26 | 15.6 | 5.15 | 16.5 | | 25.8 | 246 | 26.9 | 0.00885 | 32 | 18.2 | 10.7 | 6306 |
| 185A | R2 | EP | 75 | 50 | 13.3 | 2.9 | 14.9 | | 22.2 | 243 | 0 | | 54.5 | 4.9 | 20.2 | 18908 |
| M1 | Final | Blend | 100 | | 13.9 | 3.46 | 31.4 | 8.5 | 48 | 489 | 26.9 | | 62.40 | 37.9 | 28.7 | 25214 |
| 3 | R1 | EPDM | 25 | 26 | 16.9 | 6.77 | 16.49 | | 25.8 | 246 | 30.4 | 0.00885 | 29.9 | 15.4 | 10.9 | 5533 |
| 185B | R2 | EP | 75 | 50 | 15.7 | 3.98 | 11.45 | | 22.2 | 243 | 0 | | 55.1 | 4.9 | 21.7 | 16638 |
| M1 | Final | Blend | 100 | | 16 | 4.68 | 27.94 | 8.4 | 48 | 489 | 30.4 | | 62.30 | 32.1 | 30.2 | 22171 |
| 4 | R1 | EPDM | 43.1 | 31 | 30.5 | 4.55 | 16.36 | | 60 | 220 | 17.8 | 0.00667 | 60.2 | 37.4 | 31.7 | 18592 |
| 200A | R2 | EP | 56.9 | 65 | 34.5 | 3.28 | 11.82 | | 60 | 76.8 | 0 | | 65.2 | 25.5 | 44.2 | 24549 |
| M1 | Final | Blend | 100 | | 32.8 | 3.83 | 28.18 | 14.7 | 120 | 296.8 | 17.8 | | 75.60 | 62.7 | 61.9 | 43142 |
| 5 | R1 | EPDM | 16.2 | 22 | 12.5 | 6.06 | 16.7 | | 15 | 240 | 24.8 | 0.00884 | 22.5 | 9.8 | 7 | 3249 |
| 223B | R2 | EP | 83.8 | 40 | 12.1 | 3.68 | 11.4 | | 22.2 | 240 | 0 | | 51.2 | 3.8 | 23.7 | 16767 |
| M1 | Final | Blend | 100 | | 12.2 | 4.07 | 28.1 | 11.7 | 37.2 | 480 | 24.8 | | 55.70 | 31 | 29 | 20016 |
| 6 | R1 | EPDM | 16.8 | 21 | 15.9 | 6.59 | 16.55 | | 20.4 | 240 | 33 | 0.00884 | 21.9 | 9.8 | 6 | 3396 |
| 225A | R2 | EP | 83.2 | 40 | 15.66 | 5.03 | 11.35 | | 25.8 | 240 | 0 | | 52.7 | 4.8 | 24 | 16740 |

TABLE 1-continued

Series Reactor Run Conditions And Product Properties

| Experiment # Book # Catalyst | Reactor | Composition | Poly Split (%) | Run Temp (° C.) | EP C2= (Wt %) | Comp ENB (Wt %) | Residence Time (min) | ML (125° C.) (1 + 4) | Feed C2= (g/h) | C3= (g/h) | Rates ENB (g/h) | Catalyst (g/h) | Conversions C2= (%) | C3= (%) | ENB (%) | Catalyst Efficiency (g/g) |
|---|---|---|---|---|---|---|---|---|---|---|---|---|---|---|---|---|
| M1 | Final | Blend | 100 | | 15.7 | 5.29 | 27.9 | 7.2 | 46.2 | 480 | 33 | | 57.30 | 29.6 | 28.5 | 20135 |
| 7 | R1 | EPDM | 26.4 | 30 | 70 | 6.29 | 10.2 | | 108 | 71.4 | 20 | 0.00657 | 28.3 | 18.4 | 14.7 | 7096 |
| 270A | R2 | EPDM | 73.6 | 75 | 66.5 | 3.98 | 7.25 | | 30 | 114 | 7 | | 77.1 | 48.1 | 21.4 | 19747 |
| F4Z | Final | Blend | 100 | | 67.4 | 4.59 | 17.45 | 93 | 138 | 185.4 | 27 | | 82.20 | 29.6 | 30 | 26843 |
| 8 | R1 | EPDM | 62.5 | 30 | 32.9 | 4.06 | 10.12 | | 55.2 | 154 | 20 | 0.00657 | 76.6 | 56 | 27.2 | 20453 |
| 272A | R2 | EPDM | 37.5 | 75 | 79.5 | 4.59 | 7.23 | | 100 | 32.4 | 7 | | 54 | 61 | 17.1 | 12287 |
| F4Z | Final | Blend | 100 | | 50.4 | 4.26 | 17.35 | 10.3 | 155.2 | 186.4 | 27 | | 66.60 | 54.6 | 33.8 | 32740 |
| 9 | R1 | EPDM | 21.3 | 30 | 36.8 | 1.16 | 10.12 | | 60 | 165 | 10 | 0.00503 | 33.8 | 21.1 | 6.5 | 11074 |
| 293B | R2 | EPDM | 78.7 | 75 | 55.9 | 0.58 | 7.2 | | 100 | 32.4 | 10.4 | | 81.6 | 70.1 | 6 | 40786 |
| F4Z | Final | Blend | 100 | | 51.8 | 0.7 | 17.27 | 49 | 160 | 197.4 | 20.4 | | 83.90 | 63.2 | 8.9 | 51860 |
| 10 | R1 | EPDM | 56.6 | 50 | 68.9 | 5.06 | 10.34 | | 108 | 78 | 20 | 0.00503 | 61.8 | 38.7 | 25.8 | 20301 |
| 293D | R2 | EPDM | 43.4 | 75 | 30.7 | 5.11 | 7.4 | | 30 | 130 | 10.2 | | 32 | 12.8 | 16 | 15575 |
| F4Z | Final | Blend | 100 | | 52.3 | 5.08 | 17.7 | 9.5 | 138 | 208 | 30.2 | | 64.90 | 39.3 | 30.3 | 35876 |
| 11 | R1 | EPDM | 76.9 | 62 | 75.3 | 4.34 | 10.1 | | 108 | 71.5 | 17.5 | 0.00600 | 60.2 | 29.9 | 22.4 | 15060 |
| 319B | R2 | None | 23.1 | 90 | 75.1 | 5.6 | 10.1 | | 0 | 0 | 0 | | 44.8 | 38.4 | 11.2 | 4519 |
| F4Z | Final | EPDM | 100 | | 75.2 | 4.63 | 20.2 | 124.3 | 108 | 71.5 | 17.5 | | 78.00 | 38.8 | 31.1 | 19579 |
| 12 | R1 | EPDM | 50.9 | 62 | 76.2 | 4.35 | 10.1 | | 108 | 71.5 | 17.5 | 0.00600 | 60.7 | 28.6 | 22.4 | 14996 |
| 319C | R2 | EP | 49.1 | 90 | 38.9 | 2.68 | 7.1 | | 15 | 243 | 0 | | 57.2 | 11.2 | 17.1 | 14449 |
| F4Z | Final | Blend | 100 | | 57.9 | 3.53 | 17.2 | 15 | 123 | 314.5 | 17.5 | | 80.20 | 22.8 | 35.6 | 29444 |
| 13 | R1 | EPDM | 28.7 | 61 | 71 | 6.69 | 10.1 | | 90 | 63 | 20 | 0.00680 | 58.4 | 34.2 | 26.5 | 11682 |
| 334B | R2 | EP | 71.3 | 100 | 43.8 | 2.54 | 9.46 | | 78 | 178 | 0 | | 72 | 37.8 | 33.9 | 28959 |
| F4Z | Final | Blend | 100 | | 51.2 | 3.73 | 19.53 | 13.2 | 168 | 241 | 20 | | 81.10 | 53.8 | 51.5 | 40641 |
| 14 | R1 | EPDM | 47.5 | 61 | 71.5 | 4.45 | 9.76 | | 192 | 90.6 | 20 | 0.00730 | 73.2 | 62 | 45.8 | 28208 |
| 337C | R2 | EP | 52.5 | 74 | 50 | 1.67 | 6.77 | | 126 | 283 | 0 | | 63.1 | 35.2 | 35 | 31172 |
| M1 | Final | Blend | 100 | | 60.2 | 2.99 | 16.53 | 55 | 318 | 373.6 | 20 | | 79.60 | 44.8 | 64.7 | 59380 |
| 15 | R1 | EPDM | 40.5 | 62 | 71.2 | 5.86 | 9.91 | | 132 | 90 | 21.7 | 0.00730 | 68.1 | 40.4 | 36.2 | 18376 |
| 340C | R2 | EP | 59.5 | 74 | 41.4 | 2.48 | 6.83 | | 126 | 285 | 0 | | 47.2 | 23.4 | 35.1 | 26892 |
| M1 | Final | Blend | 100 | | 53.5 | 3.85 | 16.7 | 19.9 | 258 | 375 | 21.7 | | 65.9 | 39.4 | 58.6 | 45268 |
| 16 | R1 | EPDM | 100 | 66 | 45.7 | 3.38 | 9.43 | | 150 | 300 | 20 | 0.01030 | 76.8 | 45.6 | 44 | 25322 |
| 383A | R2 | None | | | | | | | | | | | | | | |
| M1 | Final | EPDM | 100 | | 45.7 | 3.38 | 9.43 | 13.4 | 150 | 300 | 20 | | 76.8 | 45.6 | 44 | 25322 |
| 17 | R1 | EPDM | 100 | 66 | 43.6 | 3.39 | 18.86 | | 75 | 150 | 10 | 0.00513 | 91.2 | 59.1 | 55.1 | 31698 |
| 383B | R2 | None | | | | | | | | | | | | | | |
| M1 | Final | EPDM | 100 | | 43.6 | 3.39 | 18.86 | 9.3 | 75 | 150 | 10 | | 91.2 | 59.1 | 55.1 | 31698 |
| 18 | R1 | EPDM | 64.7 | 66 | 45.1 | 3.99 | 10.98 | | 150 | 300 | 20 | 0.01030 | 89.6 | 54.6 | 61.9 | 30152 |
| 383C | R2 | EP | 35.3 | 64 | 48.8 | 2.04 | 7.66 | | 90 | 90 | 0 | | 76.8 | 35.8 | 45.2 | 16461 |
| M1 | Final | Blend | 100 | | 46.4 | 3.30 | 18.64 | 9.7 | 240 | 390 | 20 | | 89.7 | 63.8 | 79.1 | 46613 |

What is claimed is:

1. A method of making a blend comprising a terpolymer of ethylene, higher alpha-olefin, and non-conjugated diene which comprises:
   (a) feeding solvent and a first set of monomers comprising ethylene, a $C_3$ to $C_8$ alpha-olefin, and a diene in predetermined proportions to a first continuous flow stirred tank reactor;
   (b) adding a metallocene catalyst to the first reactor;
   (c) operating the first reactor to polymerize the first set of monomers to produce an effluent containing a first copolymer;
   (d) feeding the effluent of (c) to a second continuous flow stirred tank reactor;
   (e) feeding a second set of monomers comprising ethylene and a $C_3$ to $C_8$ aipha-olefin in predetermined proportions to the second reactor; and
   (f) operating the second reactor to polymerize the second set of monomers and any unreacted monomers to produce a second copolymer;
wherein 50–100 wt % of the total amount of catalyst added to all reactors is added to the first reactor.

2. The method of claim 1 wherein 50–100 wt % of non-conjugated diene added to all the reactors is added to the first reactor.

3. The method of claim 2 wherein the monomer proportions of the first and second reactor are controlled so that over about 35% by weight of total polymer weight is made in the second reactor where total polymer weight is defined as the weight of polymer made in the first reactor and second reactor.

4. The method of claim 2, wherein the monomer proportions of the first and second reactor are controlled so that the first copolymer has an ethylene content of 0–85 wt % ethylene, the second copolymer has an ethylene content of 0–85 wt %, and the first and second copolymers together have an average ethylene content of 6–85 wt %.

5. The method of claim 2, wherein the monomer proportions of the first and second reactor are controlled so that the first copolymer has a non-conjugated diene content of 0–20 wt %, the second copolymer has a non-conjugated diene content of 0–20 wt %, and the first and second copolymers together have an average non-conjugated diene content of 0–20 wt %.

6. The method of claim 5, wherein the non-conjugated diene is selected from the group consisting of 5-ethylidene-2-norbornene (ENB), 1,4-hexadiene, dicyclopentadiene (DCPD), norbomadiene, and 5-vinyl-2-norbornene (VNB), and mixtures thereof.

7. The method of claim 2, wherein the molecular weight of the first or second copolymer or both copolymers is controlled by at least one of: (a) adding a chain transfer agent to the first or second reactor or both reactors, and (b) operating the first and second reactors adiabatically with a temperature difference between the reactors.

8. The method of claim 7, wherein the molecular weight of the first or second copolymer or both copolymers is controlled so that the $M_w/M_n$ of the terpolymer is 2.0–12.0.

9. The method of claim 7, wherein the molecular weight of the first or second copolymer or both copolymers is controlled so that the weight average $M_w$ of the terpolymer is 10,000 to 3,000,000.

10. The method of claim 2, wherein the metallocene catalyst is a group 4, 5, or 6 metallocene catalyst activated by methylalumoxane or a non-coordinating anion.

11. The method of claim 2 wherein the catalyst is chiral and stereorigid.

12. The method of claim 2, wherein the monomer proportions of the first and second reactor are controlled so that either the first or second copolymer contains less than 35% by weight ethylene.

13. The method of claim 12, wherein the first or second copolymer contains less than 20% ethylene and has isotactic propylene crystallinity.

14. The method of claim 2, wherein the monomer proportions of the first and second reactor are controlled so that either the first or second copolymer is semi-crystalline.

15. The method of claim 2, wherein the monomer proportions of the first and second reactor are controlled so that the first and second copolymers are incompatible and form a two phase mixture.

16. The method of claim 2, wherein the metallocene catalyst is selected from the group consisting of $\mu$-(CH$_3$)$_2$Si(Indenyl)$_2$Hf(CH$_3$)$_2$, $\mu$-(CH$_3$)$_2$Si[tetramethylcyclopentadienyl][adamantylamido] Ti(CH$_3$)$_2$, and $\mu$-(C$_6$H$_5$)$_2$Si[cyclopentadienyl][flourenyl]Hf(CH$_3$)$_2$.

17. The method of claim 4 wherein the first reactor operates at temperatures of about 0 to 100° C.

18. The method of claim 2 wherein the reactors are cooled at least in part by feed prechilling and there is a temperature difference between the reactors.

19. The method of claim 2 wherein a scavenger is added to at least one of the sets of monomers before their respective polymerizations.

20. The method of claim 1, wherein the reactors are adiabatic.

21. The method of claim 1, wherein the method is carried out under homogeneous solution phase conditions.

22. A process for making a polymer blend comprising:
 (a) copolymerizing a first set of monomers comprising ethylene, a C$_3$ to C$_8$ alpha-olefin, and a non-conjugated diene in a first continuous flow stirred tank reactor, in the presence of a metallocene catalyst, to form an effluent comprising a first copolymer;
 (b) directing the effluent to a second continuous flow stirred tank reactor in series with the first reactor; and
 (c) copolymerizing a second set of monomers comprising ethylene and a C$_3$ to C$_8$ alpha-olefin in the second reactor, in the presence of a metallocene catalyst and the effluent from the first reactor, to form a blend of a second copolymer and the first copolymer, the polymer blend comprising from 6 to 85 wt % ethylene;
 wherein 50–100 wt % of the total amount of catalyst added to the reactors is added to the first reactor; and
 wherein 50–100 wt % of the total amount of non-conjugated diene added to the reactors is added to the first reactor.

23. The process of claim 22, wherein the monomer proportions of the first and second reactor are controlled so that the first copolymer has a non-conjugated diene content of less than 20 wt %, the second copolymer has a non-conjugated diene content of 0–20 wt %, and the first and second copolymers together have an average non-conjugated diene content of less than 20 wt %.

24. The process of claim 22, wherein the second set of monomers further comprises a non-conjugated diene.

25. The process of claim 22, wherein the non-conjugated diene is selected from the group consisting of 5-ethylidene-2-norbornene (ENB), 1,4-hexadiene, dicyclopentadiene (DCPD), norbornadiene, 5-vinyl-2-norbornene (VNB), and mixtures thereof.

26. The process of claim 23, wherein the non-conjugated diene content of the first and second copolymers differs by at least 5% relative wt %.

27. The process of claim 23, wherein the non-conjugated diene content of the first and second copolymers differs by at least 10% relative wt %.

28. The process of claim 22, wherein the monomer proportions of the first and second reactor are controlled so that over about 35 % by weight of the polymer blend is made in the second reactor.

29. The process of claim 22, wherein at least one of the first and second reactors is adiabatic.

30. The process of claim 22, wherein the blend has a Mw/Mn ratio of 2.0–12.0.

31. The process of claim 22, wherein the blend has a Mw/Mn ratio of 2.0–5.0.

32. The process of claim 22, wherein one of the copolymers is semi-crystalline, and the other copolymer is amorphous.

33. The process of claim 22, wherein the monomer proportions of the first and second reactor are controlled so that either the first or second copolymer contains less than 35 wt % ethylene.

34. The process of claim 33, wherein the first or second copolymer contains less than 20 wt % ethylene and has isotactic propylene crystallinity.

35. The process of claim 22, wherein the metallocene catalyst is selected from the group consisting of $\mu$-(CH$_3$)$_2$Si(Indenyl)$_2$Hf(CH$_3$)$_2$, $\mu$-(CH$_3$)$_2$Si[tetramethylcyclopentadienyl][adamantylamido] Ti(CH$_3$)$_2$, and $\mu$-(C$_6$H$_5$)$_2$Si[cyclopentadienyl][flourenyl]Hf(CH$_3$)$_2$.

36. The process of claim 22, wherein the monomer proportions of the first and second reactor are controlled so that the first and second copolymers are incompatible and form a two phase mixture.

37. The process of claim 22, wherein the metallocene catalyst is chiral and stereorigid.

38. A method of making a blend comprising an ethylene-propylene-diene terpolymer by homogeneous solution phase polymerization, the method comprising:
 (a) copolymerizing a first set of monomers comprising ethylene, propylene, and a non-conjugated diene selected from the group consisting of 5-ethylidene-2-norbornene (ENB), 1,4-hexadiene, dicyclopentadiene (DCPD), norbomadiene, and 5-vinyl-2-norbornene (VNB), in a first adiabatic continuous flow stirred tank reactor, in the presence of a metallocene catalyst, to form an effluent comprising a first copolymer;
 (b) directing the effluent to a second adiabatic continuous flow stirred tank reactor in series with the first reactor;
 (c) copolymerizing a second set of monomers comprising ethylene and propylene in the second reactor, in the presence of a metallocene catalyst and the effluent from the first reactor, to form a blend of a second copolymer and the first copolymer, the blend comprising from 6 to 85 wt % ethylene.

39. The method of claim 38, wherein the monomer proportions of the first and second reactor are controlled so that the first copolymer has a non-conjugated diene content of less than 20 wt %, the second copolymer has a non-conjugated diene content of 0–20 wt %, and the first and second copolymers together have an average non-conjugated diene content of less than 20 wt %.

40. The method of claim 38, wherein the second set of monomers further comprises a non-conjugated diene.

41. The method of claim 39, wherein the non-conjugated diene content of the first and second copolymers differs by at least 10% (relative) wt %.

42. The method of claim 38, wherein the monomer proportions of the first and second reactor are controlled so that over about 35 % by weight of the blend is made in the second reactor.

43. The method of claim 38, wherein the blend has a Mw/Mn ratio of 2.0–5.0.

44. The method of claim 38, wherein one of the copolymers is semi-crystalline, and the other copolymer is amorphous.

45. The method of claim 38, wherein the monomer proportions of the first and second reactor are controlled so that either the first or second copolymer contains less than 35 wt % ethylene.

46. The method of claim 38, wherein the first or second copolymer contains less than 20 wt % ethylene and has isotactic propylene crystallinity.

47. The method of claim 38, wherein the metallocene catalyst is selected from the group consisting of $\mu$-$(CH_3)_2$Si$(Indenyl)_2$Hf$(CH_3)_2$, $\mu$-$(CH_3)_2$Si[tetramethylcyclopentadienyl][adamantylamido] Ti$(CH_3)_2$, and $\mu$-$(C_6H_5)2$Si[cyclopentadienyl][flourenyl]Hf$(CH_3)_2$.

48. The method of claim 38, wherein the monomer proportions of the first and second reactor are controlled so that the first and second copolymers are incompatible and form a two phase mixture.

49. The method of claim 38, wherein the metallocene catalyst is chiral and stereorigid.

50. The method of claim 1, wherein the metallocene catalyst comprises two cyclopentadienyl ring systems locked into a rigid configuration through a bridging group.

51. The method of claim 1, wherein the $C_3$-$C_8$ alpha olefin in steps (a) and (c) is propylene.

52. The method of claim 22, wherein the metallocene catalyst in steps (a) and (c) comprises two cyclopentadienyl ring systems locked into a rigid configuration through a bridging group.

53. The method of claim 22, wherein the $C_3$-$C_8$ alpha olefin in steps (a) and (c) is propylene.

54. The method of claim 38, wherein the metallocene catalyst in steps (a) and (c) comprises two cyclopentadienyl ring systems locked into a rigid configuration through a bridging group.

55. A method of making a blend comprising a terpolymer of ethylene, propylene, and non-conjugated diene which comprises:

(a) feeding solvent and a first set of monomers comprising ethylene, propylene, and a diene in predetermined proportions to a first continuous flow stirred tank reactor;

(b) adding a metallocene catalyst to the first reactor, the metallocene catalyst comprising two cyclopentadienyl ring systems locked into a rigid configuration through a bridging group;

(c) operating the first reactor to polymerize the first set of monomers to produce an effluent containing a first copolymer;

(d) feeding the effluent of (c) to a second continuous flow stirred tank reactor;

(e) feeding a second set of monomers comprising ethylene and propylene in predetermined proportions to the second reactor; and (f) operating the second reactor to polymerize the second set of monomers and any unreacted monomers to produce a second copolymer;

wherein 50–100 wt% of the total amount of catalyst added to all reactors is added to the first reactor.

56. A process for making a polymer blend comprising:

(a) copolymerizing a first set of monomers comprising ethylene, propylene, and a non-conjugated diene in a first continuous flow stirred tank reactor, in the presence of a metallocene catalyst comprising two cyclopentadienyl ring systems locked into a rigid configuration through a bridging group, to form an effluent comprising a first copolymer;

(b) directing the effluent to a second continuous flow stirred tank reactor in series with the first reactor; and (c) copolymerizing a second set of monomers comprising ethylene and a propylene in the second reactor, in the presence of a metallocene catalyst comprising two cyclopentadienyl ring systems locked into a rigid configuration through a bridging group and the effluent from the first reactor, to form a blend of a second copolymer and the first copolymer, the polymer blend comprising from 6 to 85 wt% ethylene;

wherein 50–100 wt% of the total amount of catalyst added to the reactors is added to the first reactor; and wherein 50–100 wt% of the total amount of non-conjugated diene added to the reactors is added to the first reactor.

57. A method of making a blend comprising an ethylene-propylene-diene terpolymer by homogeneous solution phase polymerization, the method comprising:

copolymerizing a first set of monomers comprising ethylene, propylene, and a non-conjugated diene selected from the group consisting of 5-ethylidene-2-norbornene (ENB), 1,4-hexadiene, dicyclopentadiene (DCPD), norbornadiene, and 5-vinyl-2-norbornene (VNB), in a first adiabatic continuous flow stirred tank reactor, in the presence of a metallocene catalyst comprising two cyclopentadienyl ring systems locked into a rigid configuration through a bridging group, to form an effluent comprising a first copolymer;

directing the effluent to a second adiabatic continuous flow stirred tank reactor in series with the first reactor; and copolymerizing a second set of monomers comprising ethylene and propylene in the second reactor, in the presence of a metallocene catalyst comprising two cyclopentadienyl ring systems locked into a rigid configuration through a bridging group and the effluent from the first reactor, to form a blend of a second copolymer and the first copolymer, the blend comprising from 6 to 85 wt% ethylene.

* * * * *